Dec. 19, 1950  G. W. WARDWELL, JR  2,534,744
BOMB SHACKLE
Filed Sept. 2, 1949

INVENTOR.
GEORGE W. WARDWELL Jr.
BY G. D. O'Brien

Patented Dec. 19, 1950

2,534,744

UNITED STATES PATENT OFFICE 2,534,744

BOMB SHACKLE

George W. Wardwell, Jr., Trumbull, Conn., assignor, by mesne assignments, to the United States of America as represented by the Secretary of the Navy Application September 2, 1949, Serial No. 113,846

3 Claims. (Cl. 89—1.5)

This invention relates to release mechanisms and more particularly to a new and improved bomb shackle for use on aircraft.

In the conventional type of aircraft bomb there are ordinarily provided spaced transversely extending longitudinally aligned supporting eyes adapted to be engaged by a suitable bomb release shackle and be releasable by mechanisms under the control of the bombardier or pilot.

Some types of bomb shackles have a number of moving parts which slidably operate upon each other. The attendant friction is a cause of undue wear and ultimate breakdown is the result. Such construction may work satisfactorily during level flight but may fail when the bombing plane is disposed at an angle as may be made necessary by the exigencies of an attack.

Consequently it is an object of the present invention to provide a bomb shackle which is of great simplicity and which will effect the quick release of the bomb in all positions of the aircraft.

Another object is to provide a shackle which can be quickly recocked when another bomb is to be loaded.

A further object is to provide a simple bomb shackle having a single means operable to release the bomb and to recock the device when another bomb is to be loaded.

Another object of the invention is to provide a bomb shackle having a positive locking means for effectively maintaining the shackle in bomb holding position.

Figure 1:
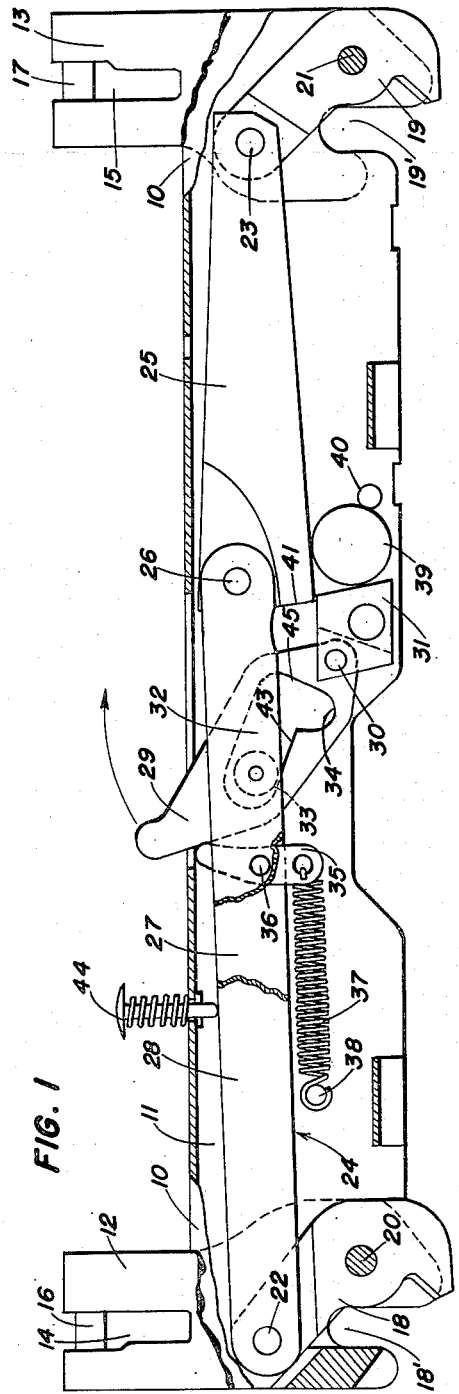
Figure 2:
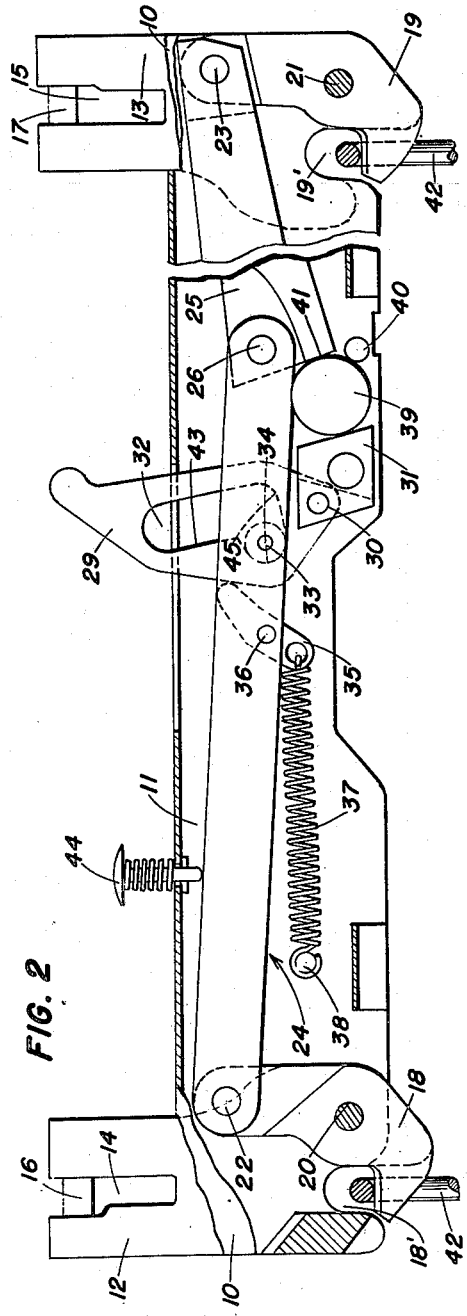

Other objects and their attendant advantages will become apparent from the following description and attached drawings wherein:

Fig. 1 is a longitudinal section through one embodiment of the present invention with the parts in unlocked or bomb release position; and Fig. 2 is a change position view similar to Fig. 1 but showing the parts in locked position.

In the embodiment illustrated in the drawings, there is provided a pair of spaced elongated plates 10 and 11 secured at either end to hinge members 12 and 13. The hinge members comprise yokes adapted to straddle the plates 10 and 11 and be welded or otherwise secured thereto. The upper portions of the yokes are transversely bifurcated so as to form notches 14 and 15 to receive bomb rack mounting members (not shown) affixed to a plane. Short horizontal pins 16 and 17 secured in the bifurcated portions as shown serve to engage such mounting members.

Between the plates 10 and 11 are are a pair of bomb supporting hooks 18 and 19 which are pivotally disposed at opposite ends of the shackle on transverse pins 20 and 21 secured through the plates and the hinge members 12 and 13. The hooks in the locked position of the shackles as shown in Fig. 2 sufficiently close the entrance of the openings 18' and 19' to engage bomb eyes 42 or other suitable members to which the bomb is attached. The upper ends of the hooks 18 and 19 are each attached by pivot pins 22 and 23 to longitudinal links 24 and 25 which in turn are pivotally attached to each other at their adjacent ends by means of pivot pin 26. The link 24 is preferably formed of two spaced strips 27 and 28 (Fig. 1) adapted to embrace the upper portion of hook 18 at one end, and the cutaway portion of the end of link 25 at the other end as shown. It will be apparent that the hooks 18 and 19 and the links 24 and 25 are movable simultaneously and furthermore movement of the links to the right in Fig. 1 has the effect of moving the hooks to the closed or bomb supporting position of Fig. 2.

Releasable means for closing and locking the links in bomb holding position are provided and this means will now be described. Mounted between the plates 10 and 11 is a trip lever 29 pivoted at itst lower end on pivot pin 30 fixed in a suitable journal and spacing block 31 which is slotted to receive the lower end of the lever. Centrally of the lever 29 is a cam slot 32 adapted to receive a roller pin 33 mounted between the sides 27 and 28 of the link 24. In the lower end of the cam slot 32 there is a semicircular recess 34 which receives the roller pin 33 when the parts of the shackle are in a closed and locked position as shown in Fig. 2. To retain the roller pin 33 and the semicircular recess 34 in engagement, a latch 35, pivoted on a pin 36 between the strips 27 and 28 of the link 24, is caused to bear against the side of the trip lever 29 by a spring 37 secured at one end to a pin 38 mounted in the side plates 10 and 11 and secured at the other end to the lower portion of the latch, as shown.

When the hooks are in the open position of Fig. 1, the lower surface of the link 25 rides on a large roller 39 which floats between a roller retaining pin 40, interconnecting the plates 10 and 11 and the journal and spacing block 31 substantially as shown.

On the lower portion of the inner end of the link 25 there is provided a shoulder 41 which may drop down behind the roller 39 and engage it as illustrated in Fig. 2. With the shoulder so engaged the weight of the bomb hanging from the hooks tends to exert tension on the link 24 and compression on the link 25, and the force so exerted is borne by the shoulder 41 acting on the roller 39.

When a bomb is to be loaded onto the shackle, it is lifted in any convenient manner so that the bomb eyes 42 are properly positioned in the openings 18' and 19'. The shackle is then closed and locked in a bomb supporting position by moving the trip lever 29 in a clockwise direction as shown by the arrow in Fig. 1. The surface 43 of the cam slot 32 is thus caused to bear against the roller pin 33 which in turn causes the links 24 and 25 to move to the right and the hooks 18 and 19 toward the closed position of Fig. 2. When the shoulder 41 on the lower inner end of the link 25 has passed over the top of the roller 39 the shackle may be locked in its closed position by pressing down on a button 44 which may be located on either side of the trip lever 29 to contact the upper surface of either link 24 or 25 and which forces links 24 and 25 down so that the end 41 of link 25 bears against the roller 39 and at the same time the roller pin 33 is seated in the semi-circular recess 34 in the cam slot 32. With the roller pin 33 thus seated in the recess 34 it will be seen that upward movement of the links 24 and 25 and consequent disengagement of the shoulder 41 from the roller 39 is prevented and the shackle is thus effectively locked in its closed position. The trip lever 29 is restrained against movement in a counterclockwise or releasing direction by means of the latch 35 as above-described.

With the parts in the position of Fig. 2, when it is desired to release the bomb the trip lever 29 is moved in a counterclockwise direction and the roller pin 33 is disengaged from the recess 34. Continued counterclockwise movement of the trip lever has the effect of camming the roller pin 33 upwardly on the lower surface 45 of the cam slot 32 thereby raising the links 24 and 25 sufficiently to permit the shoulder 41 to be rolled up and out of engagement with the roller 39 by the weight of the bomb acting on the hooks 18 and 19. At the instant the shoulder 41 is disengaged from the roller 39, the links are free to move to the left and open the hooks to release the bomb.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A bomb release shackle having in combination, an elongated supporting frame, bomb carrying hooks pivoted in said frame at opposite ends thereof, links pivotally attached to each hook and to each other so that the hooks may be moved simultaneously, a roller pin mounted on one of the links, an operating lever pivotally mounted in the frame and containing a cam slot cooperable with the roller pin so that movement of the operating lever causes a corresponding movement of the links and their hooks, a shoulder on one of the links, a stop with which the shoulder is engaged when the hooks and their links are in bomb holding position, detent means in engagement with the operating lever for retaining the shoulder in engagement with the stop, and means for releasing a bomb upon movement of the operating lever in a releasing direction said movement serving to lift the shoulder out of engagement with the stop so that the hooks may be moved to release the bomb.

2. A bomb shackle having in combination, a supporting frame, bomb carrying hooks pivoted in the frame, link means interconnecting the hooks so that said hooks will operate simultaneously, an operating lever containing an L-shaped cam slot mounted in the frame, a roller pin mounted on one of the links and adapted to cooperate with the L-shaped cam slot so that movement of said operating lever transmits motion to the links and the hooks, a roller stop on which the other link rides when the shackle is in a bomb releasing position, a shoulder on the inner end of said link adapted to engage the roller stop when the operating lever has been moved in a bomb engaging direction, push button means for forcing the shoulder into engagement with the roller stop, and releasable locking means engageable with the operating lever for retaining the shoulder in engagement with the roller, means for normally urging said operating lever into its locked position, and means for releasing a bomb held in the hooks by movement of the operating lever in a bomb releasing direction said movement causing the cam slot to react on the roller pin to lift the links and the shoulder out of engagement with the roller stop, the weight of the bomb acting on the hooks causing the links to move in a bomb releasing direction opening the hooks to release the bomb.

3. In a bomb releasing shackle, a frame, bomb supporting hooks pivoted in the frame at opposite ends thereof, links attached to each hook and to each other so that the hooks are simultaneously operable, a shoulder on one of the links, a stop mounted in the frame over which the shoulder rides when the links and their respective hooks are moved to a bomb supporting position and against which stop the shoulder abuts when the hooks are supporting a bomb thereby retaining the hooks in a bomb supporting position, and means for raising the links and the shoulder above the stop so that the weight of the bomb acting on the hooks can open them to release the bomb.

GEORGE W. WARDWELL, Jr.

REFERENCES CITED

The following references are of record in the file of this patent:

UNITED STATES PATENTS

| Number | Name | Date |
| --- | --- | --- |
| 1,508,192 | Lesh | Sept. 9, 1924 |

FOREIGN PATENTS

| Number | Country | Date |
| --- | --- | --- |
| 581,889 | Great Britain | Oct. 29, 1946 |